United States Patent [19]

VanHeuman

[11] 3,928,878
[45] Dec. 30, 1975

[54] COMBINATION ELECTRICAL CABLE CUTTERS, STRIPPERS AND PLIERS

[76] Inventor: Frederick VanHeuman, 20 Thomas St., Sydney, Australia

[22] Filed: Mar. 13, 1974

[21] Appl. No.: 450,746

[30] Foreign Application Priority Data
Mar. 15, 1973 Austria .............................. 2610/73

[52] U.S. Cl. ........................ 7/5.5; 81/9.5 R; 30/90.1
[51] Int. Cl.² ........................ H02G 1/12; B25F 1/00
[58] Field of Search ................. 7/3 R, 5.4, 5.5, 5.6; 30/90.1, 254, 295; 81/9.5 R, 428 R

[56] References Cited
UNITED STATES PATENTS
3/1835 Heinisch .............................. 30/254
2,697,956 12/1954 Cook, Jr. .......................... 81/9.5 R FOREIGN PATENTS OR APPLICATIONS
802,567 2/1951 Germany .................................. 7/5.2

Primary Examiner—Al Lawrence Smith
Assistant Examiner—Roscoe V. Parker, Jr.
Attorney, Agent, or Firm—Brisebois & Kruger

[57] ABSTRACT

A combination tool having cutting and wire stripping functions associated with conventional plier structure developed to minimize the number of tools which have to be carried by linesmen and like tradesmen who work in different and dangerous locations. The tool has on one face of the pliers wire cutting functions and on the other face insulation stripping elements.

6 Claims, 4 Drawing Figures

COMBINATION ELECTRICAL CABLE CUTTERS, STRIPPERS AND PLIERS

BACKGROUND OF THE INVENTION

This invention relates to a combination tool for use as an electrical cable cutter, cable stripper and pliers. The object of the present invention is to provide a tool which is particularly useful for electrical tradesmen who are required to join or splice cables together. In such an operation it is usually necessary to cut the wires to the correct length, to remove a selected length of insulation from the wires to bare the ends, to splice or wrap the wires together and then to trim the splice or join to the correct length and to remove any surplus wire.

SUMMARY OF THE INVENTION

In many instances the aforementioned splicing or like operation is carried out at an inconvenient location such as on a junction box and the present invention offers the operator the convenience of using one tool for all of the aforesaid operations instead of a multiplicity of tools which have to be carried and manipulated by the operator.

In accordance with the present invention there is provided a combination tool having crossed handles pivoted together with a jaw formation on one end having opposed faces and forming cooperating engaging surfaces whereby movement of the pivoted handles towards each other causes the jaws to move together and vice versa, each jaw formation having on one side a cutting jaw extending generally transversally outwards and having cutting surfaces which engage upon closing of the jaws, and abutment members on the opposite jaw faces having stripper jaws which engage together to form a restricted opening therebetween for stripping the insulation from around an insulated conductor inserted therebetween.

DESCRIPTION OF THE DRAWINGS

The invention is hereinafter described with reference to the accompanying drawings in which.

DESCRIPTION OF THE PREFERRED EMBODIMENTS

Figure 1:
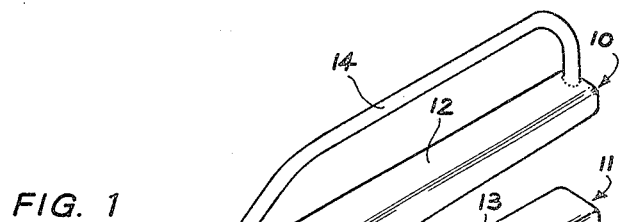
FIG. 1 is a isometric front/side elevation of the combination tool of this invention.
Figure 4:
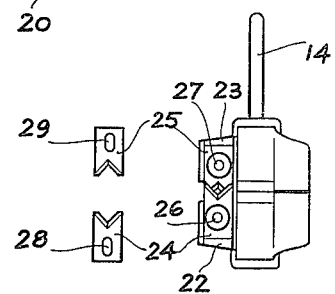
FIG. 4 is an end elevation of the tool of FIG. 1.
Figure 2:
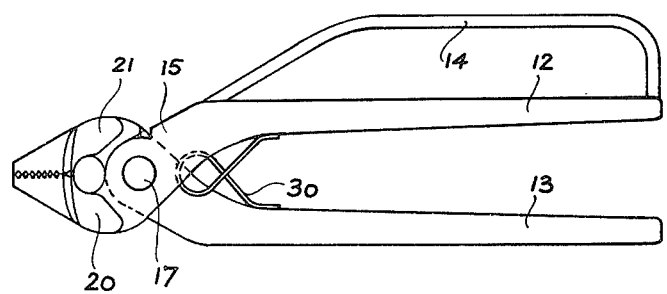
FIG. 2 is a side elevation of the tool of FIG. 1.
Figure 3:
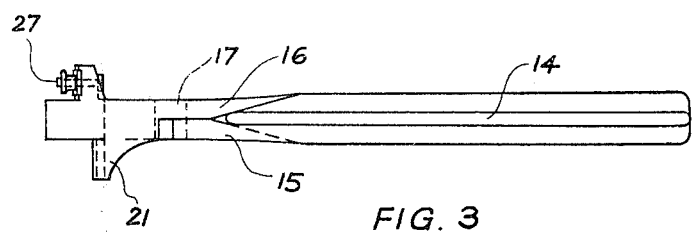
FIG. 3 is a plan of the tool of FIG. 1.

The combination tool comprises two handle members 10 and 11 being the upper and lower handle members as shown in FIG. 1. Each handle member has an insulated part 12 and 13 and the upper handle member has an elongated rod or protection band 14 extending from end to end but spaced from the handle to provide a safety grip.

Each handle member has a complementary bearing part 15, 16 axle 17 therebetween and plier jaws 18, 19 all arranged in a similar fashion to an ordinary set of pliers.

Extending from adjacent faces of one side of the plier jaws 18, 19 are cutter jaws 20, 21 having cooperating cutter edges which engage as the handles are urged towards each other to the closed position.

On the opposite face of the plier jaws are abutments 22 and 23 having either integral or separate opposed notch stripper jaws 24, 25 which coact when the jaws 18, 19 are brought together to form a restricted opening to receive the conductor of an insulated cable the insulation being severed by the stripper jaws and retained when the conductor is pulled away from the stripper jaws in a direction away from the end of the conductor. The stripper jaws 24, 25 with slots 28, 29 may be mounted on headed pins 26, 27. Headed pins 26, 27 may be replaced with a stud and nut combination and if desired a spring 31 may be placed on the pin or studs to spring bias the stripper jaws against the abutments, preferably into a guideway 32, or towards the head of the pins or the retaining nuts if springs 31 are placed between abutments 22, 23 and stripper jaws 24, 25.

With a stud and retaining nut combination and the spring or a spacer positioned between the stripper jaws and the abutments it is possible to adjust their path of travel so that they meet with the minimum amount of clearance.

A loop spring 30 is provided to bias the handles so that they automatically return to an open position.

I claim:

1. A combination tool having crossed handles pivoted together with a protection loop extending along, spaced from, and integral with one of the handles, and each handle having an integral jaw formation on one end, having opposed faces, and forming cooperating engaging surfaces whereby movement of the pivoted handles toward each other causes the jaws to move together and vice versa, each jaw formation having on one side, an integral cutting jaw extending generally transversly outwards adjacent the pivot point, and having cutting surfaces which engage upon closing of the jaws, and having an arcuate shape to define a transverse opening in the jaw formation in the closed position, and integral abutment members on the opposite jaw faces having stripper jaws which engage together to form a restricted opening therebetween for stripping the insulation from around an insulated conductor inserted therebetween, said stripper jaws including blade members having cooperating shaped notches which form said restricted opening, headed pins adjustably mounting said blade members on the respective abutment members, and resilient means on one of said pins and engaging a blade member.

2. A tool according to claim 1 wherein said resilient means comprises a spring urging the blade member toward the abutment.

3. A tool as claimed in claim 1 in which each headed pin comprises a stud and nut combination.

4. A tool according to claim 3 wherein, each blade member has a slot, the respective pins extend through the respective slots, and said spring is on one pin between the nut and the blade member to urge the blade member toward the abutment.

5. A tool according to claim 4 wherein, said abutments include guideways for said blade members, and said blade members seat in said guideways.

6. A tool according to claim 1 which further includes, spring means between the handles to urge the jaws toward an open position.

* * * * *

UNITED STATES PATENT AND TRADEMARK OFFICE
CERTIFICATE OF CORRECTION

PATENT NO. : 3,928,878
DATED : December 30, 1975
INVENTOR(S) : FREDERICK VAN HEUMEN It is certified that error appears in the above–identified patent and that said Letters Patent are hereby corrected as shown below:

[76] Inventor: Frederick Van Heumen, 20 Thomas St., Sydney, Australia

[30] Foreign Application Priority Data

March 15, 1973    Australia.............2610/73

Signed and Sealed this

Twenty-sixth Day of October 1976

[SEAL]

Attest:

RUTH C. MASON
Attesting Officer

C. MARSHALL DANN
Commissioner of Patents and Trademarks